United States Patent
Carlsson

(10) Patent No.: US 7,542,722 B2
(45) Date of Patent: Jun. 2, 2009

(54) METHOD AND ARRANGEMENT FOR MINIMIZING INTRACELL INTERFERENCE IN A DATA TRANSMISSION SYSTEM

(75) Inventor: Roland Carlsson, Öjersjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 352 days.

(21) Appl. No.: 10/583,456

(22) PCT Filed: Dec. 19, 2003

(86) PCT No.: PCT/SE03/02047

§ 371 (c)(1), (2), (4) Date: Jun. 19, 2006

(87) PCT Pub. No.: WO2005/060295

PCT Pub. Date: Jun. 30, 2005

(65) Prior Publication Data

US 2007/0167191 A1    Jul. 19, 2007

(51) Int. Cl.
| | |
|---|---|
| H04B 3/10 | (2006.01) |
| H04B 7/212 | (2006.01) |
| H04B 1/00 | (2006.01) |
| H04J 3/12 | (2006.01) |
| H04J 11/00 | (2006.01) |
| H04J 3/00 | (2006.01) |
| H04J 4/00 | (2006.01) |
| H04Q 7/20 | (2006.01) |
| H04Q 7/00 | (2006.01) |
| G01S 3/02 | (2006.01) |

(52) U.S. Cl. .............. 455/63.1; 455/422.1; 455/437; 455/446; 455/449; 455/450; 370/204; 370/208; 370/280; 370/329; 370/330; 342/451

(58) Field of Classification Search ............ 455/63.1, 455/422.1, 446, 449, 450, 501, 522, 562.1, 455/437, 456.1; 370/204, 208, 280, 330, 370/331, 335, 338, 342, 347, 329, 343, 401; 342/451

See application file for complete search history.

(56) References Cited

U.S. PATENT DOCUMENTS 5,732,076 A * 3/1998 Ketseoglou et al. ......... 370/347

(Continued)

FOREIGN PATENT DOCUMENTS

EP    0841826    5/1998

(Continued)

OTHER PUBLICATIONS

International Search Report for PCT/SE2003/002047 dated Jul. 20, 2004.

(Continued)

Primary Examiner—William D Cumming
(74) Attorney, Agent, or Firm—Nixon & Vanderhye, P.C.

(57) ABSTRACT

An arrangement and a method for minimizing intracell and/or intercell interference for a data transmission system comprises a scheduler (2). A first base station (BS) receives information from user equipments (UE1-UE4) in a first cell (1) by means of a first antenna system (Rx, Tx). The scheduler (2) identifies the position of each user and allots a first time slot (TS1) to at least one user equipment (UE1) in a first cell segment (CS1) in the first cell (1). The scheduler (2) also allots the first time slot to at least one user (UE3) equipment in a second cell segment (CS2) in the first cell (1). The antenna system (Rx, Tx) then sends information from the base station (BS) simultaneously to all user equipments (UE1, UE3) allotted to the first time slot.

24 Claims, 6 Drawing Sheets

U.S. PATENT DOCUMENTS

| | | | |
|---|---|---|---|
| 6,130,886 A * | 10/2000 | Ketseoglou et al. | 370/347 |
| 6,229,792 B1 * | 5/2001 | Anderson et al. | 370/280 |
| 6,301,238 B1 | 10/2001 | Hagerman et al. | |
| 6,711,120 B1 * | 3/2004 | Laroia et al. | 370/204 |
| 6,813,253 B1 | 11/2004 | Yamaguchi | |
| 6,980,810 B1 * | 12/2005 | Gerakoulis et al. | 455/450 |
| 7,162,203 B1 * | 1/2007 | Brunner | 455/63.1 |
| 7,194,269 B2 * | 3/2007 | Sydor | 455/446 |
| 7,383,057 B1 * | 6/2008 | Senarath et al. | 455/522 |
| 2001/0047424 A1 | 11/2001 | Alastalo et al. | |
| 2002/0090979 A1 * | 7/2002 | Sydor | 455/562 |
| 2003/0227889 A1 | 12/2003 | Wu et al. | |
| 2005/0213552 A1 * | 9/2005 | Bar-Ness et al. | 370/342 |
| 2005/0272433 A1 * | 12/2005 | Won et al. | 455/449 |
| 2006/0083161 A1 * | 4/2006 | Laroia et al. | 370/208 |
| 2006/0092881 A1 * | 5/2006 | Laroia et al. | 370/331 |
| 2006/0292989 A1 * | 12/2006 | Gerlach et al. | 455/63.1 |
| 2007/0097928 A1 * | 5/2007 | Anderson | 370/335 |
| 2007/0104164 A1 * | 5/2007 | Laroia et al. | 370/338 |
| 2007/0140168 A1 * | 6/2007 | Laroia et al. | 370/330 |
| 2007/0167191 A1 * | 7/2007 | Carlsson | 455/562.1 |
| 2007/0173261 A1 * | 7/2007 | Priotti et al. | 455/450 |
| 2007/0298718 A1 * | 12/2007 | Je et al. | 455/63.1 |
| 2008/0057932 A1 * | 3/2008 | Brunner | 455/422.1 |
| 2008/0057933 A1 * | 3/2008 | Brunner | 455/422.1 |
| 2008/0125154 A1 * | 5/2008 | Zirwas et al. | 455/501 |

FOREIGN PATENT DOCUMENTS

JP     2000-270364 A     9/2000

OTHER PUBLICATIONS

EP Communication mailed Jul. 4, 2007 in corresponding EP application 03768481.8.

* cited by examiner

METHOD AND ARRANGEMENT FOR MINIMIZING INTRACELL INTERFERENCE IN A DATA TRANSMISSION SYSTEM

This application is the U.S. national phase of international application PCT/SE2003/002047 filed 19 Dec. 2003, which designated the U.S., the entire content of which is hereby incorporated by reference.

TECHNICAL FIELD

The invention refers to an arrangement and a method for minimizing intracell and/or intercell interference in a data transmission system comprising a scheduler that manages at least a first cell by communicating with a first base station communicating with a number of user equipments in the first cell via a first antenna system effective in one or more cell segment covering certain directions in the first cell.

BACKGROUND ART

Abbreviations:

| | |
|---|---|
| 3GPP | 3rd Generation Partnership Project |
| HSDPA | High Speed Downlink Packet Access |
| HS-TTI | High Speed transport time interval |
| HS-DATA | High Speed data |
| UE | User Equipment |
| RNC | Radio Network Controller |

The 3rd Generation Partnership Project (3GPP) specification is a standard for the third generation mobile telephony system. The system support uses different user data rates for different users. The transmission power used for a certain user is determined by interference level in a certain cell, user data rate, channel quality and requested quality of the data transmission in the cell.

HSDPA is a data transmission system that is a part of the 3GPP standard and is mainly used for best effort downlink transmission packet service, i.e. the transmission delay is not critical.

It is previously known that a base station (a.k.a. node B) operates the cell and that a scheduling algorithm situated in Node B decides to what user equipment (UE) data shall be transmitted. The UE may be any mobile or fixed equipment operated by a person on foot or in a vehicle. The decision from the scheduler is performed for every time slot. i.e. every Transport Time Interval (TTI). There is one base station and thus one scheduler for each cell in a system with a number of cells.

The scheduler can be based on several parameters e.g. data waiting time, channel quality, UE capabilities and priority of important data. Node B can transmit data to several UE in parallel within a TTI.

Problems with existing solutions are interference for a HSDPA channel to a specific UE. The interference mainly consist of thermal noise, transmitted power from other cells, dedicated channel power transmitted in the cell, power for common channels other than HSDPA in the cell, and transmitted HSDPA power to other UEs in the cell.

In order to maximize the data throughput, it is desired to minimise the interference that arises at the UE. It is previously known to do this by introducing beam forming functions (i.e. adaptive antenna system). The adaptive antenna system uses the beam forming function to cover only one or several cell segments in which cell segments are separated in space. This will reduce interference from other cells as well as from the actual cell since the antenna operates in one or several determined directions and therefore will not transmit in an omni-directional manner. The UE in a first cell segment will not be affected by the transmission in a second cell segment. Furthermore, the adjacent cell placed outside the beam forming direction will not be affected by the transmission. However, if there are a number of UEs in the same cell segment, the transmitted power to the different UEs will still interfere. For example, if user equipment UE1 and user equipment UE2 occupy the same cell segment and if Node B transmits data to both the UEs, then the both UEs will interfere each other.

For all channels except HSDPA channels the RNC decides when to transmit data. This means that interference cannot be avoided in node B in those cases where the UEs are in the same direction, i.e. in the same cell segment.

Hence, there still is a need for a better transmission of information in a cell comprising a number of user equipments such that the intracell interference is minimised when using a data transmission system, for example HSDPA.

SUMMARY

The object of the present invention is to remedy the above stated problem. The problem is solved by an arrangement and a method for minimizing intracell and/or intercell interference for a data transmission system comprising a scheduler that manages at least a first cell by communicating with a first base station communicating with a number of user equipments in the first cell via a first antenna system effective in one or more cell segments covering certain directions in the first cell, where the method comprises the steps of;

the first base station receiving information from the user equipments in the first cell, by means of the first antenna system;

the first base station communicating the information to the scheduler;

the scheduler identifying each user equipment in the first cell;

the scheduler identifying in which cell segment each user is positioned;

the scheduler allotting a first time slot to at least one user equipment in a first cell segment in the first cell;

the scheduler allotting the first time slot also to at least one user equipment in a second cell segment in the first cell;

the antenna system sending information from the base station simultaneously to all user equipments allotted to the first time slot.

An advantage of the technology disclosed herein is that the intracell and or intercell interference is minimised which leads to that less power is needed when the base station BS transmits data to a user equipment UE, so called down link, or when a UE transmits data to a BS, so called uplink. A further advantage is that this will lead also to less interference in the network, which in turn leads to that the total data throughput in the network can be raised. Here, intercell interference refers to the interference between a number of cells and intracell interference refers to the interference within the cell.

In the case of downlink, the information sent by the antenna system from the base station to all user equipments allotted to the first time slot, refers to information intended for the UEs to receive and use. For example, messages or a control signal telling the UEs to listen to the following information sent out by the BS.

In the case of uplink, the information sent by the antenna system from the base station to all user equipments allotted to the first time slot, refers to information instructing or allowing the UEs to transmit information to the BS. For example, the information sent to the UE may be in the form of a permission flag for transmitting, or any other suitable control signal. The BS then signals downlink referring to which UE that is allowed to transmit. In this way the BS may minimise uplink interference. The advantages of such handling will, as before, mainly be seen in a base station using an adaptive antenna solution.

The technology disclosed herein is preferably used in a data transmission such as the previously known HSDPA, but may also be used in a different system where data (preferably data packets) is communicated between user equipments and base stations. However, in order to further explain the technology disclosed herein references are made to an HSDPA system.

HSDPA is a service where a Node B (the base station BS) determines the amount of data to be transmitted, when to transmit as well as the used transmission power.

There is a new HSDPA transmission every time slot. This corresponds to a High Speed-Time Transport Time Interval (HS-TTI) of 2 ms. The technology disclosed herein refers to time slots and in HSDPA system the time slot refers to the Transport Time Interval (TTI). The technology disclosed herein is not restricted to a time slot of 2 ms, but may use another time interval.

According to the technology disclosed herein the scheduler divides the cell into the cell segments on the basis of preferably the intracell interference determined by the scheduler by using the spatial information about where each user equipment is situated in the cell. Preferably, the scheduler according to the technology disclosed herein divides the cell into cell segments on the basis of an optimum regarding, for example, transmission rates etc, and/or the minimum intercell and intracell interference.

By using the spatial information about where each user equipment UE is situated within a cell (i.e. in which cell segment), it is possible to determine the intracell interference that will arise if transmission to two UEs is performed. Since the HSDPA scheduler determines when data shall be sent to an UE, it can also minimise the intracell interference. This can be performed by transmitting to UEs in different cell segments such that it does not lead to intracell interference in the same time slot (HS-TTI).

According to the technology disclosed herein the scheduler preferably allots the time slots to the user equipments on the basis of intracell and/or intercell interference determined by the scheduler by using the spatial information about where each user equipment is situated in the cell. Preferably, the scheduler allots the time slots on the basis of an optimum regarding, for example, transmission rates etc, and/or the minimum intercell and intracell interference.

A scheduler that does not consider the arising intracell interference can for instance transmit HS-DATA to a first user equipment UE1 and a second user equipment UE2 in one HS-TTI, and to a third user equipment UE3 and fourth user equipment UE4 in the following HS-TTI. However, when UE1 and UE2 are situated in the same cell segment (i.e. in the same direction) and UE3 and UE4 are situated in the same cell segment, this will lead to the problem that the transmitted power to UE1 will interfere with the transmitted power to UE2 and vice versa. The same is valid for UE3 and UE4. This will not be the optimal way of transmitting data to the four UEs with respect to interference.

A scheduler according to technology disclosed herein that considers the arising intracell interference and which scheduler can decide when to transmit data to a UE, gives a transmission scheme as follows:

HS-DATA transmission to UE1, and UE3 in one HS-TTI and to UE2 and UE4 in the following HS-TTI.

Thus, according to one example embodiment only one user equipment in each cell segment is allotted to the first time slot such that the antenna system sends information to only one user equipment in each cell segment.

This will lead to the advantage of minimised intracell interference and thus less power is needed to transmit data to all four UEs compared to a scheduler without this feature.

However, in another example embodiment, a number of UEs (i.e. a subset of UEs) in the same cell segment are allotted to the same time slot as a number of UEs in another cell segment. For example two user equipments in at least the first cell segment are allotted to the same time slot. This situation is not as optimal as allotting only one UE per cell segment, but still gives a reduced intracell interference compared to allotting an even greater number of UEs.

In yet another embodiment the scheduler manages also a second cell by communicating with the first base station above or a second base station communicating with a number of user equipments in the second cell via the first antenna system or a second antenna system effective in one or more cell segments covering certain directions in the second cell, where the method comprises the steps of;

the first base station or the second base station receiving information from the user equipments in the second cell, by means of the first or the second antenna system;

the first or the second base station communicating the information to the scheduler;

the scheduler identifying each user equipment in the second cell;

the scheduler identifying in which cell segment each user is positioned;

the scheduler allotting the first time slot to at least one user equipment in a first cell segment in the second cell;

the scheduler allotting the first time slot also to at least one user equipment in a second cell segment in the second cell.

In this embodiment there are a number of alternatives:

1. The second cell is managed by the same base station as manages the first cell and the antenna system is the same antenna system used in the first cell.

2. The second cell is managed by the same base station as manages the first cell but using a second antenna system.

3. The second cell is managed by a second base station but the antenna system is the same antenna system used in the first cell.

4. The second cell is managed by a second base station using a second antenna system.

However, in the embodiment (alternatives 1-4) the antenna system(s) sends information from the base station(s) simultaneously to all user equipments allotted to the first time slot. Here, there may be UEs in different cells and different cell segments allotted to the same time slot.

According to this example embodiment the scheduler divides both the first cell and the second cell into the cell segments on the basis of intracell and/or intercell interference determined by the scheduler by using the spatial information about where each UE is situated in the different cells. Preferably, the scheduler divides the cell into cell segments on the basis of an optimum regarding, for example, transmission rates etc, and/or the minimum intercell and intracell interference.

Furthermore, the scheduler preferably allots the time slots to the user equipments on the basis of minimum intracell and/or intercell interference determined by the scheduler by using the spatial information about where each UE is situated in the different cells. Preferably, the scheduler allots the time slots on the basis of an optimum regarding, for example, transmission rates etc, and/or the minimum intercell and intracell interference.

The scheduler may furthermore base its choice for allotting the time slots on a number of parameters, for example:
the quality of the channel for the respective UE
priority for certain data
the available effect
idle time
the amount of data transmitted All parameters have an effect on the choices made by the scheduler regarding to which UE or UEs data is to be transmitted for each time slot.

An advantage of this example embodiment is that both the intracell and intercell interference is minimised which leads to less power being needed when transmitting data to a user equipment UE. A further advantage is that this will lead also to less interference in the network, which in turn leads to that the total data throughput in the network can be raised.

According to one example embodiment, the antenna system comprises an adaptive antenna transmitting into each cell segment using beam forming functions.

According to one example embodiment the scheduler uses the direction of arrival (DOA) in order to identify the position of the user equipments. This technique is well known from prior art.

Furthermore, the technology disclosed herein uses a chronological time slot sequence in order for the antenna system to simultaneously transmit to all user equipments in the system allotted to the same time slot.

In one embodiment the scheduler is placed in the base station (the node for the cell) and determines when to transmit data to an UE in case of HSDPA transmission. The scheduler can then select UEs in order to minimise the intracell interference. As explained above, even intercell interference can be minimised if schedulers for different cells cooperate, e.g. exchange of power setting and UE position. This could also be seen as one scheduler handling several cells.

In another embodiment the scheduler is placed at a different location than in the base station. The scheduler then communicates with one or a number of base stations in order to minimise intracell and intercell interference. The scheduler may also be placed in one base station but communicates with a number of base stations.

Below the HSDPA will be explained further as an example of how a data transmission system according to the technology disclosed herein may be structured.

High Speed Downlink Packet Access (HSDPA) is a packet-based data service in W-CDMA downlink with data transmission of up to 8-10 Mbps over a 5 MHz bandwidth in WCDMA downlink. HSDPA implementations includes Adaptive Modulation and Coding (AMC), Hybrid Automatic Request (HARQ), fast cell search, and advanced receiver design.

In the 3rd generation partnership project (3GPP) standards has been developed to include HSDPA. 3G Systems are intended to provide global mobility with a wide range of services including telephony, paging, messaging, Internet and broadband data. All 3G standards where HSDPA is a part are under constant development. An example of such developments is to use HSDPA or uplink.

UMTS offers teleservices (like speech or SMS) and bearer services, which provide the capability for information transfer between access points. It is possible to negotiate and renegotiate the characteristics of a bearer service at session or connection establishment and during ongoing session or connection.

A UMTS network consist of three interacting domains; Core Network (CN), UMTS Terrestrial Radio Access Network (UTRAN) and User Equipment (UE). The main function of the core network is to provide switching, routing and transit for user traffic. Core network also contains the databases and network management functions.

The UTRAN provides the air interface access method for User Equipment.

The Base Station is referred to as Node-B and the control equipment for Node-Bs is called Radio Network Controller (RNC).

The Core Network is divided in circuit switched and packet switched domains.

The architecture of the Core Network may change when new services and features are introduced.

Wide band CDMA technology was selected for the UTRAN air interface. UMTS WCDMA is a Direct Sequence CDMA system where user data is multiplied with quasi-random bits derived from WCDMA Spreading codes. In UMTS, in addition to channelisation, Codes are used for synchronisation and scrambling. WCDMA has two basic modes of operation: Frequency Division Duplex (FDD) and Time Division Duplex (TDD).

The functions of Node-B (base station) are:
Air interface Transmission/Reception
Modulation/Demodulation
CDMA Physical Channel coding
Micro Diversity
Error Handing
Closed loop power control
scheduling of HSDPA data
The functions of RNC are:
Radio Resource Control
Admission Control
Channel Allocation
Power Control Settings
Handover Control
Macro Diversity
Ciphering
Segmentation/Reassembly
Broadcast Signaling
Open Loop Power Control The UMTS standard does not restrict the functionality of the User Equipment in any way. Terminals work as an air interface counter part for Node-B.

BRIEF DESCRIPTION OF DRAWINGS

The invention will below be described in view of a number of drawings, where.

DETAILED DESCRIPTION

Figure 1:
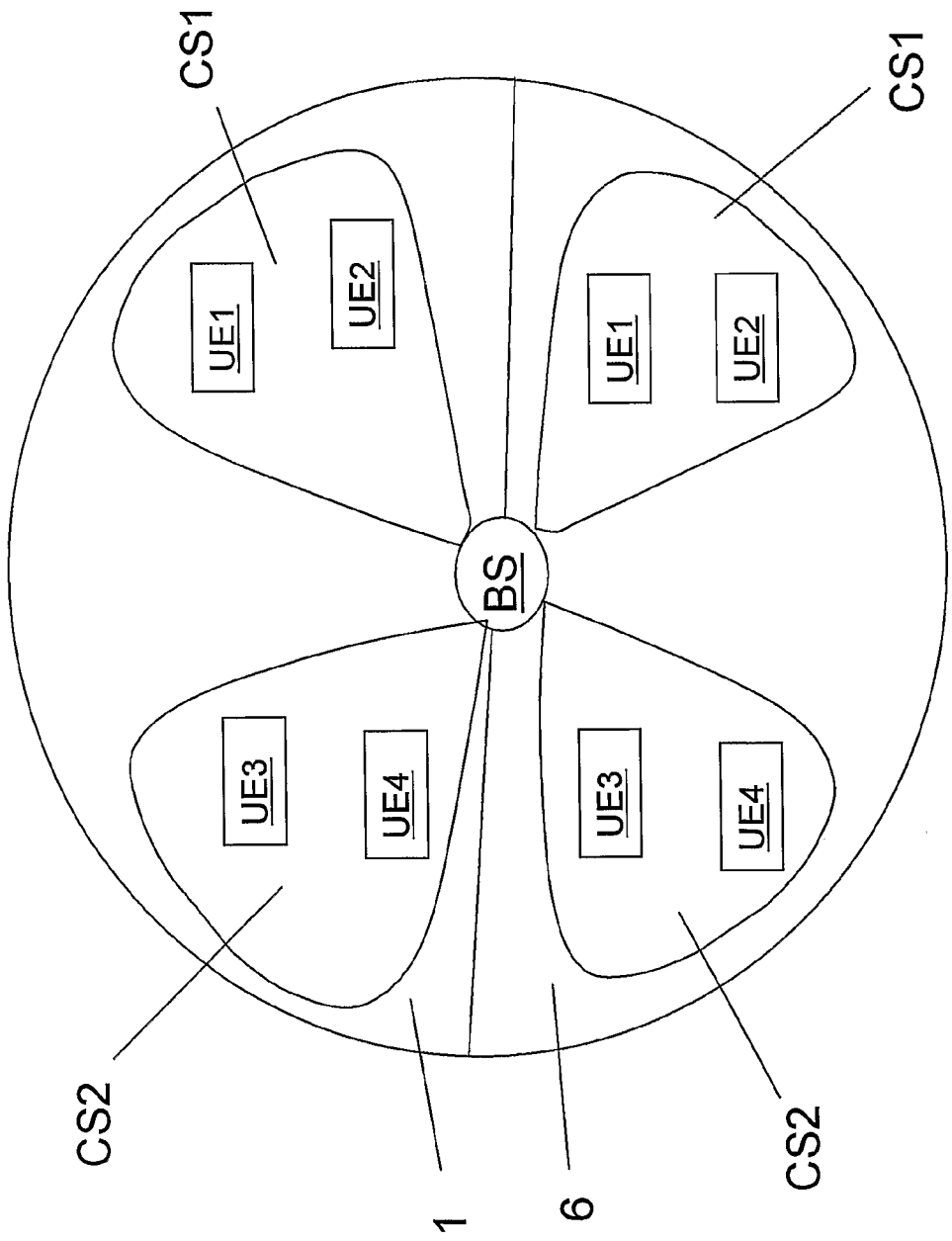
FIG. 1 schematically shows an arrangement according to an example embodiment where two cells, each comprising four user equipments, is managed by a base station.

FIG. 1 schematically shows an arrangement according to an example embodiment, where a first cell 1 is managed by a base station BS. The first cell 1 comprises four user equipments UE1, UE2, UE3 and UE4. The base station BS comprises an adaptive antenna (shown in FIG. 2 denoted Tx) arranged to send out a signal in a more preferred direction covering one or more cell segment CS. In FIG. 1 the antenna Tx (FIG. 2) sends information in the first cell 1 into two cell segments CS1 and CS2. In cell segment CS1 user equipment UE1 and UE2 are present and in cell segment CS2 user equipments UE 3 and UE4 are present.

FIG. 1 also shows that a second cell 6 is managed by the base station BS. The second cell 6 comprises four user equipments UE1, UE2, UE3 and UE4. The adaptive antenna (shown in FIG. 2 denoted Tx) is arranged to send out a signal in a preferred direction covering one or more cell segment CS1, CS2 also in the second cell. In FIG. 1 the antenna Tx sends information in the second cell 6 into two cell segments CS1 and CS2. In cell segment CS1 user equipment UE1 and UE2 are present and in cell segment CS2 user equipments UE 3 and UE4 are present.

Figure 2:
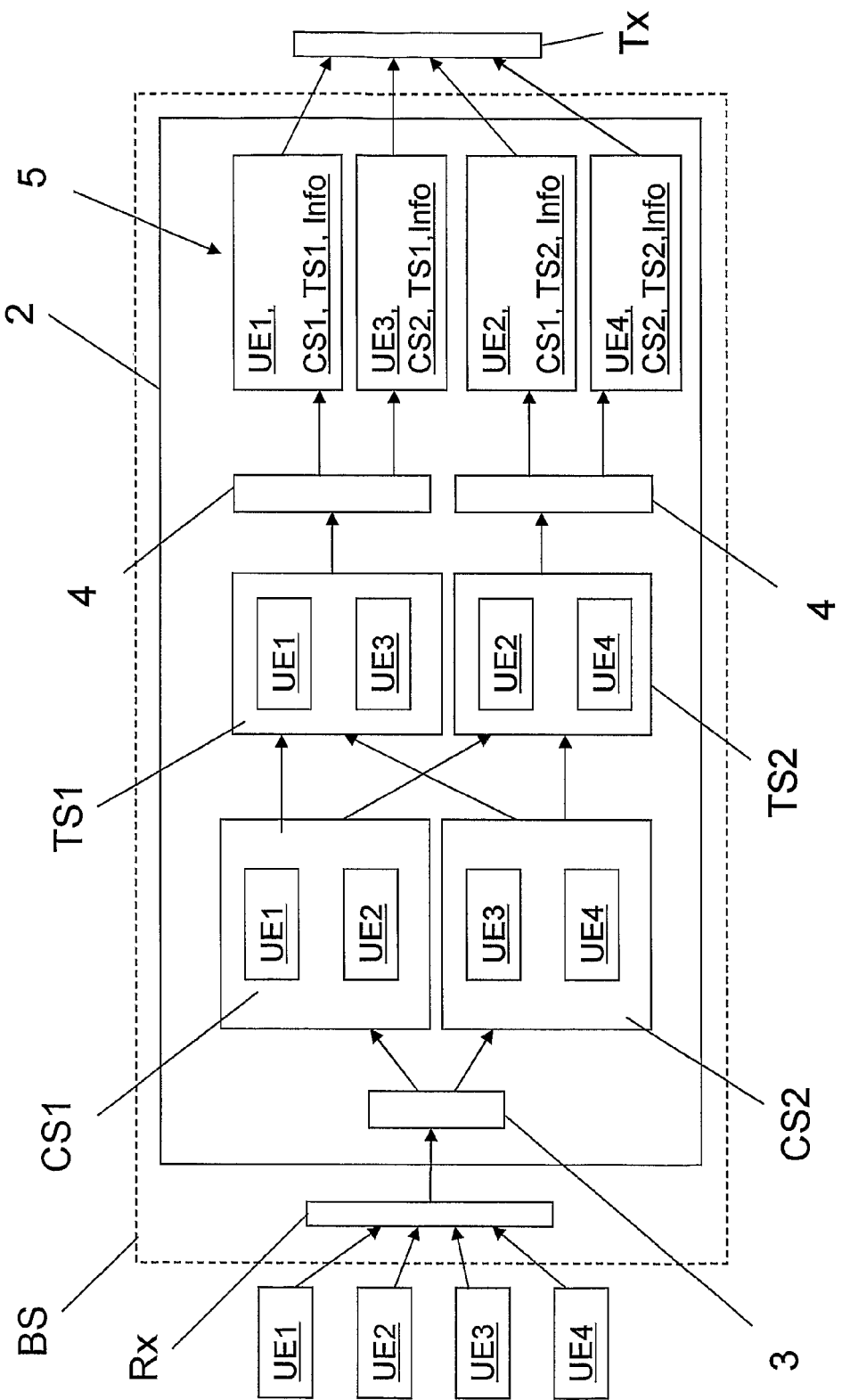
FIG. 2 schematically shows a block diagram over an internal procedure in a base station according to FIG. 1 after an intracell communication from a number of user equipments to the base station.

FIG. 2 schematically shows a block diagram over an internal procedure in a scheduler 2 arranged to manage the first cell 1 and thus the base station BS according to FIG. 1, after an intracell communication from the user equipments UE1, UE2, UE3 and UE4 to the base station BS. In FIG. 2 the user equipments UE1, UE2, UE3 and UE4 communicate with the base station BS by sending signals in the form of data packets to a receiving antenna Rx that receives the signal. The antenna Rx comprises means for forward the signal from the UEs to a comparison means 3.

The scheduler 2 comprises the comparison means 3, which is arranged for determining the Direction of Arrival (DOA), i.e. which cell segment CS1, CS2 the user equipments occupy.

After determining the location of the user equipments UE1, UE2, UE3 and UE4, the scheduler 2 organizes the user equipments in order to reply to each user equipment with a minimum of intracell interference within the first cell 1. The scheduler 2 therefore designates the user equipments UE1, UE2, UE3 and UE4 to their respective cell segment CS1 or CS2. FIG. 2 shows that UE1 and UE2 are designated CS1 and that UE3 and UE4 are designated CS2.

The scheduler 2 then allots a time slot TS for each user equipment in the first cell, where UE1 and UE3 are allotted a first time slot TS1 and where UE2 and UE4 are allotted a second time slot TS2.

After allotting time slots TS1 and TS2 to the user equipments, the scheduler 2 uses means 4 for providing information to data packets 5 intended for each user equipment in the cell 1. The reply data packets 5 are indexed with the cell segment CS and the time slot number TS in order to give each user equipment in the cell a unique identity. The UEs are informed via a special channel HS-SCCH if there is data transmitted to a specific UE. The data packets 5 are then forwarded to a transmission antenna Tx capable of transmitting the data 5 in the specific/correct CS.

Figure 3:
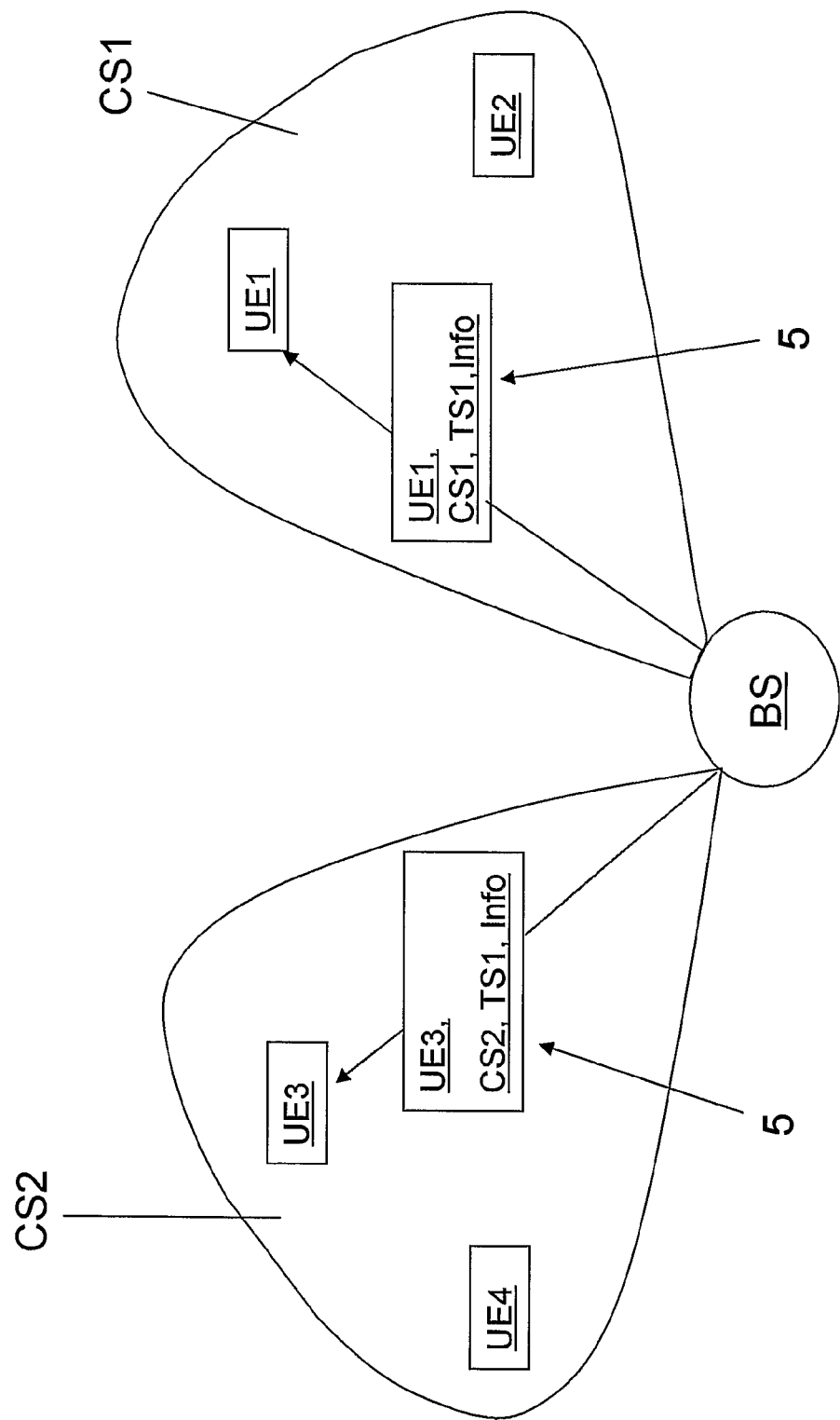
FIG. 3 schematically shows a communication procedure from the base station to allotted user equipments at a first time slot, and where.

FIG. 3 schematically shows a communication procedure from the base station BS to the allotted user equipments UE1 and UE3 in the first cell 1 at the first time slot TS1. As is shown in FIGS. 2 and 3, the reply data packet 5 to user equipment UE1 is indexed "CS1, TS1", and the reply data packet 5 to user equipment UE3 is indexed "CS2, TS1". The indexing shows that the information in the two data packets 5 are sent in the same time slot TS1 but to the different cell segments CS1 and CS2. In this way the signal to UE1 does not interfere with the signal to UE3 since they are in different direction.

Figure 4:
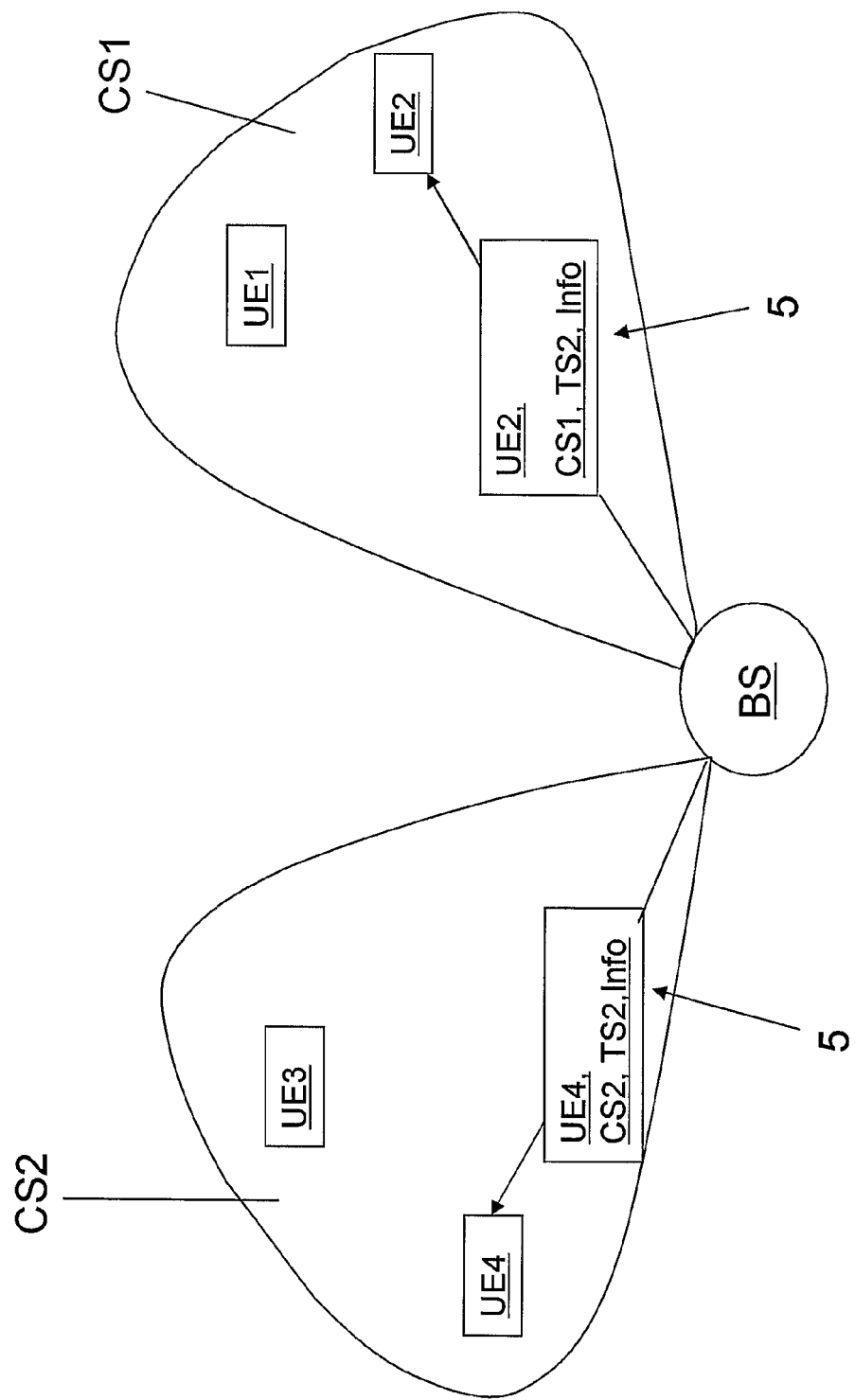
FIG. 4 schematically shows a communication procedure from the base station to allotted user equipments at a second time slot.

Furthermore, FIG. 4 schematically shows a communication procedure from the base station to the allotted user equipments UE2 and UE4 in the first cell 1 at the second time slot TS2. As is shown in FIGS. 2, and 4, the reply data packet 5 to user equipment UE2 is indexed "CS1, TS2", and the reply data packet 5 to user equipment UE3 is indexed "CS2, TS2". The indexing shows that the information in the two data packets 5 are sent in the same time slot TS2 but to the different cell segments CS1 and CS2. In this way the signal to UE2 does not interfere with the signal to UE4 since they are in different direction.

The scheduler 2 thus separates the user equipments in the first cell 1 by the use of both space and time, where the space refers to the different cell segments and where the time refers to the different time slots.

The invention shall not be seen as limited by the above described example, but may be varied within the scope of the claims. For example, the scheduler 2 may manage a number of cells according to the above scheme such that the interference between the cells (i.e. the intercell interference) is minimised as well as the intracell interference. The reply data packets are then further indexed with an index referring to the cell into which the reply package is to be sent. Furthermore, the scheduler need not be a part of the BS, but may be a separate part that communicates with some or all BSs in the system.

FIGS. 1-4 may suitably be used for clarifying the matter when the scheduler 2 manages two cells 1 and 6. As been described above FIG. 2 shows the scheduler managing the first cell 1, but the same scheme may be used also for the second cell 6. The user equipments UE1-UE4 in the second cell 6 in FIG. 1 then communicates with the base station BS.

The scheduler 2 identifies the user equipments UE1-UE4 in the second cell and where they are positioned. The scheduler identifies the user equipments in both the first cell 1 and in the second cell 6 and in which cell segment CS1, or CS2 they are positioned. The scheduler then allots the first time slot TS1 to the user equipments UE1 and UE3 according to FIG. 2.

The scheduler 2 then indexes the reply data packet with the cell number (for example C1 or C6) and the corresponding CS and the allotted TS. The reply data packet to user equipment UE1 in the second cell 1 is then indexed "C6, CS1, TS1", and the reply data packet to user equipment UE3 is indexed "C6, CS2, TS1". The indexing shows that the information in the two data packets are sent in the same time slot TS1 but to the different cell segments CS1 and CS2. In this way the signal to UE1 does not interfere with the signal to UE3 since they are in different direction. However, UE3 could have been positioned in CS2 in the first cell 1 and the reply data packet to UE3 would then have been indexed "C1, CS2, TS1". In this way the signal to UE1 does not interfere with the signal to UE3 since they are in different cells.

The indexing referring to the cell need of course not be labelled C1 or C2, but may be labelled in any suitable way. For example, if the first cell is managed by a first base station BS1 and the second cell managed by a second base station BS2 the indexing may be done by labelling according to which base station that that is to be used. For example, the reply data packet to user equipment UE1 in the first cell 1 is then indexed "BS1, CS1, TS1" accordingly.

Furthermore, the above indexing shall not be seen as limiting, but as mere examples of how the reply data packets may be indexed, i.e. the indexes TS, BS and CS are only used here for clarity, but different labelling may be used within the scope of the claim.

Figure 5:
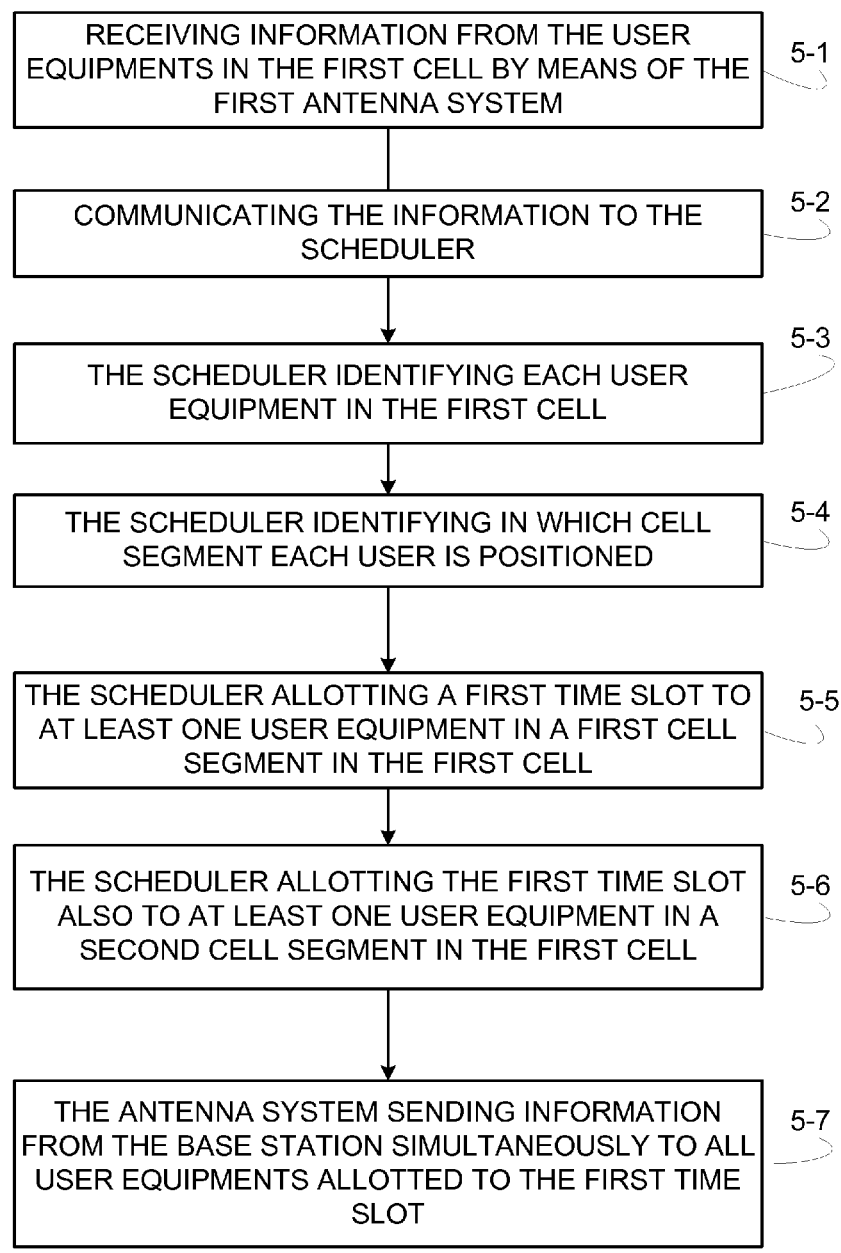
FIG. 5 is a flowchart showing basic acts or steps of a method performed when a scheduler manages at least a first cell according to an example embodiment.

FIG. 5 shows basic acts or steps of a method performed when a scheduler manages at least first cell according to an example embodiment. Act 5-1 shows the first base station receiving information from the user equipments in the first cell by means of the first antenna system. Act 5-2 shows the act of communicating the information to the scheduler. Act 5-3 shows the scheduler identifying each user equipment in the first cell. Act 5-4 shows the scheduler identifying in which cell segment each user is positioned. Act 5-5 shows the scheduler allotting a first time slot to at least one user equipment in a first cell segment in the first cell. Act 5-6 shows the scheduler allotting the first time slot also to at least one user equipment in a second cell segment in the first cell. Act 5-7 shows the first antenna system sending information from the base station simultaneously to all user ecluipments allotted to the first time slot.

Figure 6:
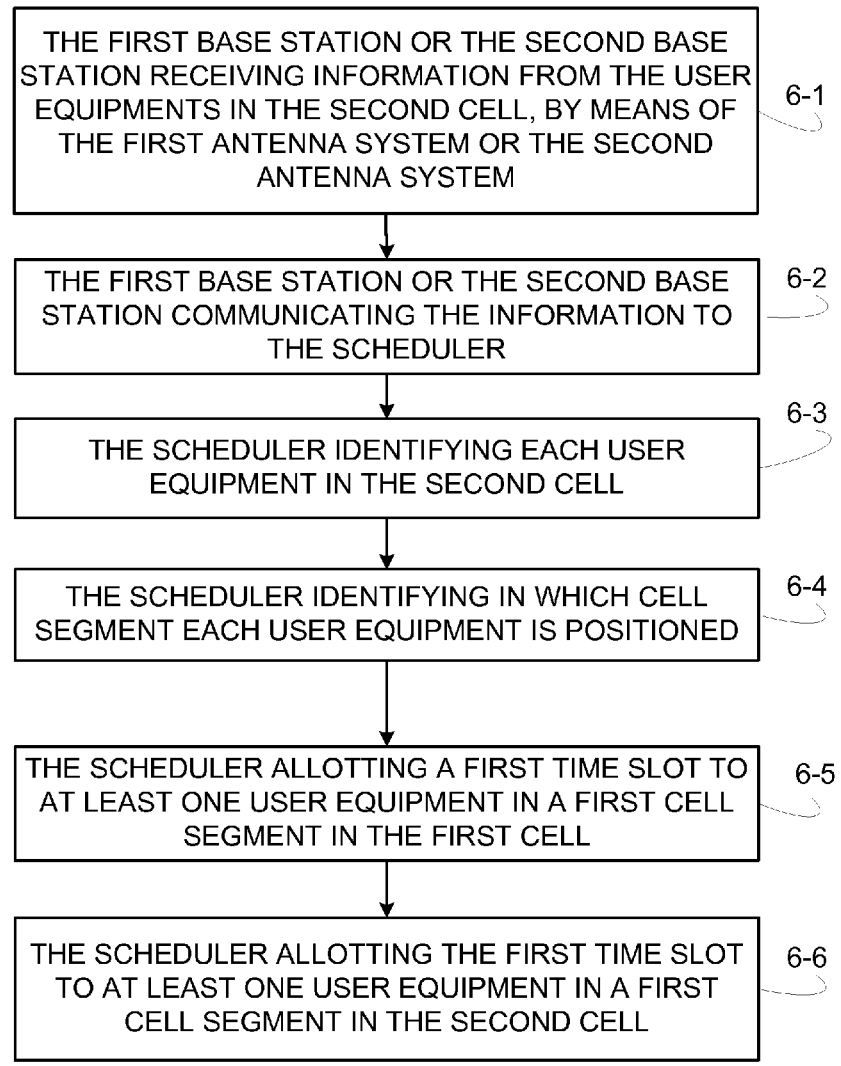
FIG. 6 is a flowchart showing basic acts or steps of a method performed when a scheduler also manages a second cell according to an example embodiment.

FIG. 6 shows basic acts or steps of a method performed when the scheduler also manages second cell according to an example embodiment. Act 6-1 shows the first base station or the second base station receiving information from the user equipments in the second cell, by means of the first antenna system or the second antenna system. Act 6-2 shows the first base station or the second base station communicating the information to the scheduler. Act 6-3 shows the scheduler identifying each user equipment in the second cell. Act 6-4 shows the scheduler identifying in which cell segment each user equipment is positioned. Act 6-5 shows the scheduler allotting the first time slot to at least one user equipment in a first cell segment in the second cell.

Furthermore, the second cell may be managed by a second base station instead of the above one base station. The scheduler then manages both base stations and thus both corresponding cells. The scheduler then divides the cells and allots the time slot such that a minimum intracell and intercell interference is obtained according to the invention.

The invention claimed is:

1. A method of operating a data transmission system comprising a scheduler that manages at least a first cell by communicating with a first base station communicating with a number of user equipments in the first cell via a first antenna system effective in one or more cell segments covering certain directions in the first cell, where the method comprises:
the first base station receiving information from the user equipments in the first cell, by means of the first antenna system;
the first base station communicating the information to the scheduler;
the scheduler identifying each user equipment in the first cells;
the scheduler identifying in which cell segment each user is positioned;
the scheduler allotting a first time slot to at least one user equipment in a first cell segment in the first cell;
the scheduler allotting the first time slot also to at least one user equipment in a second cell segment in the first cell;
the first antenna system sending information from the base station simultaneously to all user equipments allotted to the first time slot.

2. A method according to claim 1, further comprising the scheduler also managing a second cell by communicating with the first base station or a second base station communicating with a number of user equipments in the second cell via the first antenna system or a second antenna system effective in one or more cell segments covering certain directions in the second cell, where the method further comprises:
the first base station or the second base station receiving information from the user equipments in the second cell, by means of the first antenna system or the second antenna system;
the first base station or the second base station communicating the information to the scheduler;
the scheduler identifying each user equipment in the second cell;
the scheduler identifying in which cell segment each user equipment is positioned;
the scheduler allotting the first time slot to at least one user equipment in a first cell segment in the second cell;
the scheduler allotting the first time slot also to at least one user equipment in a second cell segment in the second cell.

3. A method according to claim 1, further comprising the scheduler dividing the first cell into the cell segments on the basis of interference determined by the scheduler by using spatial information about where each user equipment is situated in the first cell.

4. A method according to claim 1, further comprising the scheduler allottings the time slots to the user equipments on the basis of interference determined by the scheduler by using the spatial information about where each user equipment is situated in the cell.

5. A method according to claim 1, wherein the first antenna system comprises an adaptive antenna transmitting into each cell segment using beam forming functions.

6. A method according to claim 1, further comprising allotting only one user equipment in each cell segment to the first time slot such that the first antenna system sends information to only one user equipment in each cell segment.

7. A method according to claim 1, further comprising allotting two user equipments in at least the first cell segment to the same time slot.

8. A method according to claim 1, further comprising the first antenna system sending information from the base station simultaneously to all user equipments allotted to the first time slot.

9. A method according to claim 1, further comprising the scheduler using direction of arrival in order to identify the position of the user equipments.

10. A method according to claim 1, further comprising the first antenna system sending simultaneously to all user equipments in the system allotted to the same time slot according to a time slot sequence.

11. A method according to claim 1, further comprising using the information sent by the first antenna system for both uplink or downlink transmission.

12. A method according to claim 1, further comprising the transmission system uses HSDPA.

13. A method according to claim 1, further comprising the scheduler allotting the first time slot and/or dividing the cell into cell segments, based on the interference.

14. A data transmission system comprising:
a scheduler configured to manage at least a first cell by communicating with a first base station, the first base station in turn communicating with a number of user equipments in the first cell via a first antenna system effective in one or more cell segments covering certain directions in the first cell;
wherein the first base station is arranged to receive information from the user equipments in the first cell by means of the first antenna systems;

wherein the first base station is arranged to send the information to the schedulers;

wherein the scheduler is arranged to identify each user equipment in the first cell;

wherein the scheduler is arranged to identify in which cell segment each user is positioned;

wherein the scheduler is arranged to allot a first time slot to at least one user equipment in a first cell segment in the first cell;

wherein the scheduler is arranged to allot the first time slot also to at least one user equipment in a second cell segment in the first cell;

wherein the first antenna system is arranged to send information from the base station simultaneously to all user equipments allotted to the first time slot.

15. A system according to claim 14, wherein the scheduler is arranged to manage also a second cell by communicating with the first base station or a second base station communicating with a number of user equipments in the second cell via the first antenna system or a second antenna system effective in one or more cell segments covering certain directions in the second cell, where the arrangement comprises;

wherein the first base station or the second base station is arranged to receive information from the user equipments in the second cell, by means of the first antenna system or the second antenna system;

wherein the first base station or the second base station is arranged to send the information to the scheduler;

wherein the scheduler is arranged to identify each user equipment in the second cell;

wherein the scheduler is arranged to identify in which cell segment each user equipment is positioned;

wherein the scheduler is arranged to allot the first time slot to at least one user equipment in a first cell segment in the second cell;

wherein the scheduler is arranged to allot the first time slot also to at least one user equipment in the second cell segment in the second cell.

16. A system according to claim 14, wherein the scheduler is arranged to divide the first cell into the cell segments on the basis of interference determined by the scheduler by using spatial information about where each user equipment is situated in the first cell.

17. A system according to claim 14, wherein the scheduler is arranged to allot the time slots to the user equipments on the basis of interference determined by the scheduler by using spatial information about where each user equipment is situated in the cell.

18. A system according to claim 14, wherein the first antenna system comprises an adaptive antenna arranged to transmitting into each cell segment using beam forming functions.

19. A system according to claim 14, wherein the system is arranged to allot the first time slot to only one user equipment in each cell segment such that the first antenna system sends information to only one user equipment in each cell segment.

20. A system according to claim 14, wherein the system is arranged to allot the same time slot to two user equipments in at least the first cell segment.

21. A system according to claim 14, wherein the first antenna system is arranged to send information from the base station simultaneously to all user equipments allotted to the first time slot.

22. A system according to claim 14, wherein the scheduler is arranged to use direction of arrival in order to identify the position of the user equipments.

23. A system according to claim 14, wherein the first antenna system is arranged to send simultaneously to all user equipments in the system allotted to the same time slot according to a time slot sequence.

24. a system according to claim 14, wherein the scheduler is arranged to allot the first time slot and/or divide the cell into cell segments, based on the interference.

* * * * *

UNITED STATES PATENT AND TRADEMARK OFFICE
CERTIFICATE OF CORRECTION

PATENT NO. : 7,542,722 B2
APPLICATION NO. : 10/583456
DATED : June 2, 2009
INVENTOR(S) : Carlsson It is certified that error appears in the above-identified patent and that said Letters Patent is hereby corrected as shown below:

In Column 2, Line 32, delete "of;" and insert -- of: --, therefor.

In Column 4, Line 24, delete "of;" and insert -- of: --, therefor.

In Column 9, Line 7, delete "first" and insert -- a first --, therefor.

In Column 9, Line 20, delete "ecluipments" and insert -- equipments --, therefor.

In Column 9, Line 23, delete "second" and insert -- a second --, therefor.

In Column 9, Line 54, in Claim 1, delete "cells;" and insert -- cell; --, therefor.

In Column 10, Line 25, in Claim 4, delete "allottings" and insert -- allotting --, therefor.

In Column 10, Line 53, in Claim 12, delete "further comprising" and insert -- wherein --, therefor.

In Column 10, Line 67, in Claim 14, delete "systems;" and insert -- system; --, therefor.

In Column 11, Line 2, in Claim 14, delete "schedulers;" and insert -- scheduler; --, therefor.

In Column 11, Line 22, in Claim 15, delete "comprises;" and insert -- comprises: --, therefor.

In Column 12, Line 34, in Claim 24, delete "a" and insert -- A --, therefor.

Signed and Sealed this

Eighteenth Day of May, 2010

David J. Kappos
*Director of the United States Patent and Trademark Office*